Sept. 15, 1942.   J. S. DONALDSON   2,295,722
TIRE CHAIN LINK
Filed Jan. 26, 1940
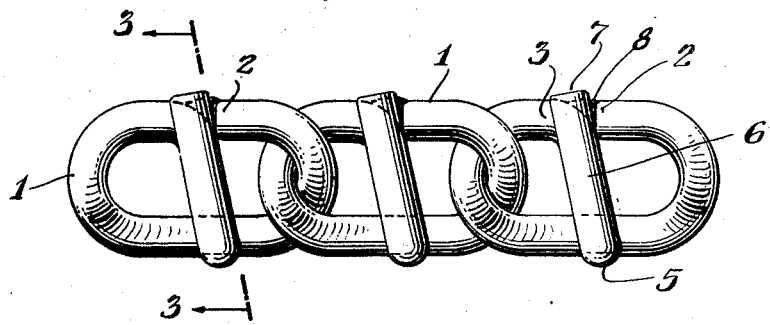
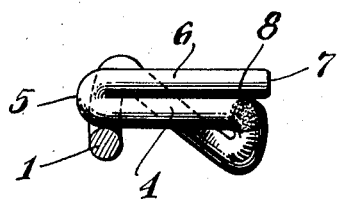
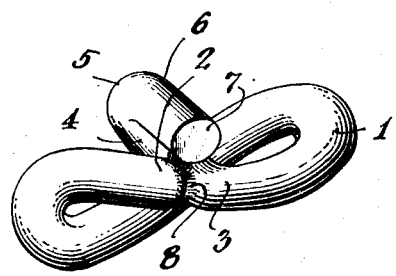
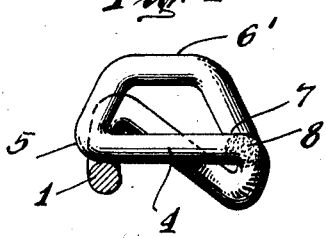
INVENTOR
John Sherman Donaldson
BY
his ATTORNEY Patented Sept. 15, 1942

2,295,722

UNITED STATES PATENT OFFICE 2,295,722

TIRE CHAIN LINK

John Shearman Donaldson, St. Albans, N. Y.

Application January 26, 1940, Serial No. 315,637

4 Claims. (Cl. 152—243)

This invention relates to links for tire cross chains, that is, the transverse members of antiskid tire chains that extend across the tire tread with their ends connected to the side chains.

Such cross chains are subjected to severe wear, and therefore wear pieces have heretofore been welded at each end to the links to take the wear, and other expedients have been adopted to improve the lasting qualities of these chains.

The object of the present invention is to provide an improved cross chain link which shall have exceptionally long life even under hard wear, and, also, improved traction under certain conditions, and which shall have a comparatively low production cost.

In carrying out the present invention, links are made from bar stock and connected to form chains, with only one welded spot per link, in such a manner that metal integral with the respective links is obtained from the bar stock and is so disposed with respect to the links that this metal bears the brunt of the wear, thus saving wear on the links and greatly prolonging the life of the chains. No welding on of metal lugs is required, and, since the metal of the bar stock which is so disposed as to take the road wear is integral with the link itself, the danger of losing insecurely welded-on wear metal is eliminated. The integral portion is much stronger than a welded-on piece would be. As with plain links made from bar stock, only one weld is required for each link.

The invention will be more clearly understood from the description in connection with the accompanying drawing, in which:

Fig. 1 is a plan view of a part of a chain according to the invention;

Fig. 2 is a perspective view of one of the links;

Fig. 3 is a section along the line 3—3 of Fig. 1; and

Fig. 4 is a view similar to Fig. 3 showing a modification.

In the drawing, reference character 1 indicates links that are somewhat twisted so that they tend to lie in a single plane when they are connected to form a chain instead of alternate links lying in one plane and the intermediate links lying in a plane at right angles to the first plane.

The links 1 are shown as being made of oval or elongated shape from short pieces of bar stock, but, instead of the end 2 of the pieces of bar stock being brought into proximity to the other end and welded to it, the stock is bent at 3 (Fig. 2) to provide a portion 4 extending across the link. This portion is doubled back at 5 so that a portion 6 lies above the portion 4 and ends at 7 near the bend 3 and end 2.

The link may then be welded as indicated at 8 so that the end 2, the bend 3, and the end 7 are welded together and a double wear-resisting piece consisting of superposed portions 4 and 6 integral with each link is provided on the outer side thereof in position to strike the road surface and take the wear, thus greatly prolonging the life of the chain. In addition, these projecting wear-resisting pieces give greater traction as they penetrate the ice or mud. A spot weld may be used to connect the band 5 to one side of the link 1 although this is not necessary.

It is also preferable to have the projecting pieces 4 and 6 disposed at an obtuse angle to the axis of the chain as they are then in position to exert better traction effect than they would be if they were parallel to the direction of travel.

In the modification shown in Fig. 4, the portion 6' instead of being a bent-back straight portion as shown in Fig. 3 is bent to have its road-contacting part spaced from the portion 4, thus providing better traction in snow or mud.

What is claimed is:

1. A link for a tire cross chain, made of a single piece of bar stock and having an end portion of the piece bent to extend across the outer face of the link between the ends thereof from one side to the other side and by a reverse bend back to the first side, such portion forming a double wear-bar extending outward from the face plane of the link.

2. A link for a tire cross chain, made of a single piece of bar stock and having an end portion of the piece bent to extend across the outer face of the link between the ends thereof from one side to the other side and by a reverse bend back to the first side, such portion forming a double wear-bar extending outward from the face plane of the link, the end of said bent portion of the piece and the other end of the piece and the bend between the side of the link and said bent portion being welded together.

3. A link for a tire cross chain, made of a single piece of bar stock and having an end portion of the piece bent to extend across the outer face of the link between the ends thereof from one side to the other side and by a reverse bend back to the first side, such portion forming a double wear-bar which extends outward from the face plane of the link with the bent back part thereof lying against the outer side of the other part thereof.

4. A link for a tire cross chain, made of a single piece of bar stock and having an end portion of the piece bent to form a double thickness wear-bar extending across the outer face of the link from one side to the other between the ends thereof at an obtuse angle to the length of the link.

JOHN SHEARMAN DONALDSON.